(12) United States Patent
Petras

(10) Patent No.: US 8,914,274 B1
(45) Date of Patent: Dec. 16, 2014

(54) METHOD AND SYSTEM FOR INSTRUCTION SET SIMULATION WITH CONCURRENT ATTACHMENT OF MULTIPLE DEBUGGERS

(75) Inventor: Dietmar Petras, Langerwehe (DE)

(73) Assignee: Synopsys, Inc., Mountain View, CA (US)

( * ) Notice: Subject to any disclaimer, the term of this patent is extended or adjusted under 35 U.S.C. 154(b) by 1291 days.

(21) Appl. No.: 11/637,418

(22) Filed: Dec. 11, 2006

(51) Int. Cl.
*G06F 9/45* (2006.01)

(52) U.S. Cl.
USPC .............................. 703/22; 703/13; 717/135

(58) Field of Classification Search
CPC .... G06F 11/3664; G06F 11/362; G06F 11/36
USPC ....................... 703/22, 13; 717/124–129, 135
See application file for complete search history.

(56) References Cited

U.S. PATENT DOCUMENTS

| | | | | |
|---|---|---|---|---|
| 5,752,068 A * | 5/1998 | Gilbert | ............................ | 712/16 |
| 5,784,552 A * | 7/1998 | Bishop et al. | .............. | 714/38.12 |
| 6,990,657 B2 * | 1/2006 | Hunter et al. | .................. | 717/129 |
| 7,124,404 B1 * | 10/2006 | Bebout et al. | ................. | 717/127 |
| 2001/0027387 A1 * | 10/2001 | Miyake et al. | .................. | 703/22 |
| 2003/0097613 A1 * | 5/2003 | Kageshima | ..................... | 714/26 |
| 2003/0110476 A1 * | 6/2003 | Aihara | ........................... | 717/135 |

OTHER PUBLICATIONS

Nagendra, G.D. et al., "Simulation Bridge: A Framework for Multi-Processor Simulation", May 6-8, 2002, Codes '02, ACM.*

* cited by examiner

*Primary Examiner* — Kamini S Shah
*Assistant Examiner* — Cedric D Johnson
(74) *Attorney, Agent, or Firm* — Fenwick & West LLP

(57) ABSTRACT

An ISS (instruction set simulator) debugging method. The method includes executing a plurality of instructions of an ISS (instruction set simulator). For each instruction, an ISS simulation state is synchronized to a simulation time when the execution of the instruction is finished. At least two debugger components are executed in conjunction with the execution of the ISS, wherein the debugger components are each coupled to control the ISS.

14 Claims, 4 Drawing Sheets

METHOD AND SYSTEM FOR INSTRUCTION SET SIMULATION WITH CONCURRENT ATTACHMENT OF MULTIPLE DEBUGGERS

TECHNICAL FIELD

The present invention relates to simulation based software development.

BACKGROUND ART

As the overall sophistication and level of integration of modern integrated circuit devices has increased, the number of lines of software code run by a typical integrated circuit device has grown from 10 or 15,000 to 2 million or 3 million. Commonly encountered everyday products from cars to cell phones to medical devices contain embedded computer system integrated circuit devices, which in turn contain increasingly large amounts of complex software. For many systems, that software now accounts for the majority of the cost and almost all of the time-to-market/schedule risk associated with such products. Furthermore, the time-to-market/schedule risk can largely be attributed to the time-consuming task of software debugging.

In order to maintain acceptable cost and schedule performance, embedded programmers (e.g., specialists in programming embedded computer system devices) must improve the way in which the resulting software code is debugged. However, as electronic systems become increasingly more complex, implementing an efficient debugging process proves problematic. Another factor that further exacerbates the problem is the growing use of multicore computer systems. Due to ever-increasing performance demands, embedded systems are increasingly moving toward multicore design.

One prior art approach to the complexity of the debugging process involved the use of simulation-based software development. Instead of utilizing hardware, the software being developed is run on a simulated model of the hardware, enabling the software development process to commence prior to actual silicon availability. The model needs to be accurate enough so that it can run the binaries unchanged. The simulation model, or ISS (instruction set simulator), enables the binaries to run while waiting for an error to be detected or the system to crash. The simulation can then be stepped forward or backward on a cycle by cycle basis to investigate how the error was caused. In this manner, the prior art system simulation processes provide controllability, observability and determinism necessary to solve the problems and bugs that occur during the software development process.

A problem exists however with the debugging processes needed for multicore integrated circuit devices. With multicore designs, software must be dynamically partitioned across the cores, and workload must be equally shared in a parallel processing manner. However, the parallel program introduces a new category of bugs caused by the interaction of multiple tasks, often dependent on the precise timing of execution, memory accesses and communications. These types of bugs are the most difficult to not only reproduce but to understand and resolve.

Additionally, prior art simulation-based software development tools are not adapted to easily handle multicore systems. For example, when one processor hits a breakpoint, the entire system must be frozen. Another problem is the fact that only one debugger can be connected to a simulated device at a time. This makes it difficult or impossible to debug multi-tasking applications, which require, for example, the following of a system call from an application into the kernel of the operating system.

Thus, what is required is a simulation-based software development tool that is adapted to function with multicore systems. A requirement exists for a component that enables the concurrent attachment of multiple debuggers to an ISS. The present invention provides a novel solution to these requirements.

SUMMARY OF THE INVENTION

Embodiments of the present invention provide a simulation-based software development tool that is adapted to function with modern multicore embedded computer systems. Embodiments of the present invention provide a component that enables the concurrent attachment of multiple debuggers to an ISS (instruction set simulator).

In one embodiment, the present invention comprises a computer implemented ISS debugging method. The method includes executing a plurality of instructions of an ISS. For each instruction, an ISS simulation state (e.g., of an embedded computer system device) is synchronized to a simulation time when the execution of the instruction is finished. At least two debugger components are executed in conjunction with the execution of the ISS. The debugger components are each coupled to control the ISS.

In one embodiment, the debugger components are configured to independently control the ISS. In one embodiment, any one of the debugger components can control the ISS by setting breakpoints within the ISS, independent of other debugger components. Alternatively, any one of the debugger components can control the ISS by setting watchpoints within the ISS, independent of other debugger components.

In one embodiment, the debugger components are connected to the ISS via an ISS run control component. The ISS run control component can be configured to attach an arbitrary number of debug components to the ISS, and prevent any run-time interference from occurring between the debug components. In one embodiment, the ISS run control component is configured enable a first run mode of a first debug component (e.g., stop, step, stall, etc.) and a second run mode of a second debug component (e.g., run, etc.), and prevent run-time interference between the first and second debug components when the first and the second run modes are both active with the ISS.

In this manner, embodiments of the present invention greatly increase the efficiency in debug multi-tasking applications, which require, for example, the following of a system call from an application into the kernel of the operating system. Multiple debug components can be used to follow multiple tasks executing on the operating system. Additionally, multiple debugger components having independent ISS control can more readily handle situations with multicore systems.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Figure 1:
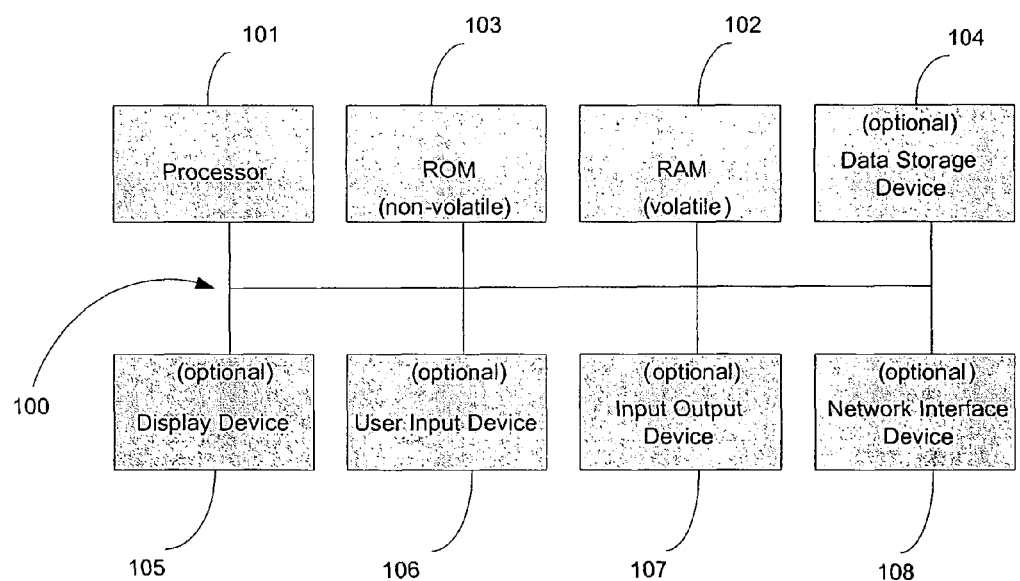
FIG. 1 shows a computer system platform in accordance with one embodiment of the present invention.

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.
Notation and Nomenclature Some portions of the detailed descriptions which follow are presented in terms of procedures, steps, logic blocks, processing, and other symbolic representations of operations on data bits within a computer memory. These descriptions and representations are the means used by those skilled in the data processing arts to convey most effectively the substance of their work to others skilled in the art. A procedure, computer executed step, logic block, process, etc., are here, and generally, conceived to be self-consistent sequences of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing," "computing," "simulating," "instantiating," "determining," "optimizing," "stepping," or the like, refer to the action and processes of a computer system, or similar electronic computing device, that manipulates and transforms data represented as physical (electronic) quantities within the computer system's registers and memories into other data similarly represented as physical quantities within the computer system registers or memories or other such information storage, transmission, or display devices.
Computer System Environment Referring to FIG. 1, a computer system 112 is illustrated. Within the following discussions of the present invention, certain processes and steps are discussed that are realized, in one embodiment, as a series of instructions (e.g., software program) that reside within computer readable memory units of system 112 and executed by processors of system 112. When executed, the instructions cause computer system 112 to perform specific actions and exhibit specific behavior which is described in detail to follow.

Specific aspects of the present invention are operable within a programmed computer aided software development system. A computer system 112 operable to implement the elements of the present invention is shown in FIG. 1. In general, the computer system 112 of the present invention includes an address/data bus 100 for communicating information, one or more central processor(s) 101 coupled with bus 100 for processing information and instructions, a computer readable volatile memory unit 102 (e.g., random access memory, static RAM, dynamic RAM, etc.) coupled with bus 100 for storing information and instructions for the central processor(s) 101, a computer readable non-volatile memory unit 103 (e.g., read only memory, programmable ROM, flash memory, EPROM, EEPROM, etc.) coupled with bus 100 for storing static information and instructions for processor(s) 101.

System 112 can optionally include a mass storage computer readable data storage device 104, such as a magnetic or optical disk and disk drive coupled with bus 100 for storing information and instructions. Optionally, system 112 can also include a display device 105 coupled to bus 100 for displaying information to the computer user, a user input device 106 (e.g., keyboard, mouse, etc.) coupled to bus 100 for communicating user provided information and/or command selections to central processor(s) 101, and input output device 107 for accepting removable/detachable computer readable media (e.g., disks, flash memory cards, etc.), and a network interface device 108 coupled to the bus 100 for communicating messages, command selections, data, etc., to and from processor(s) 101 and any external network.

Figure 2:
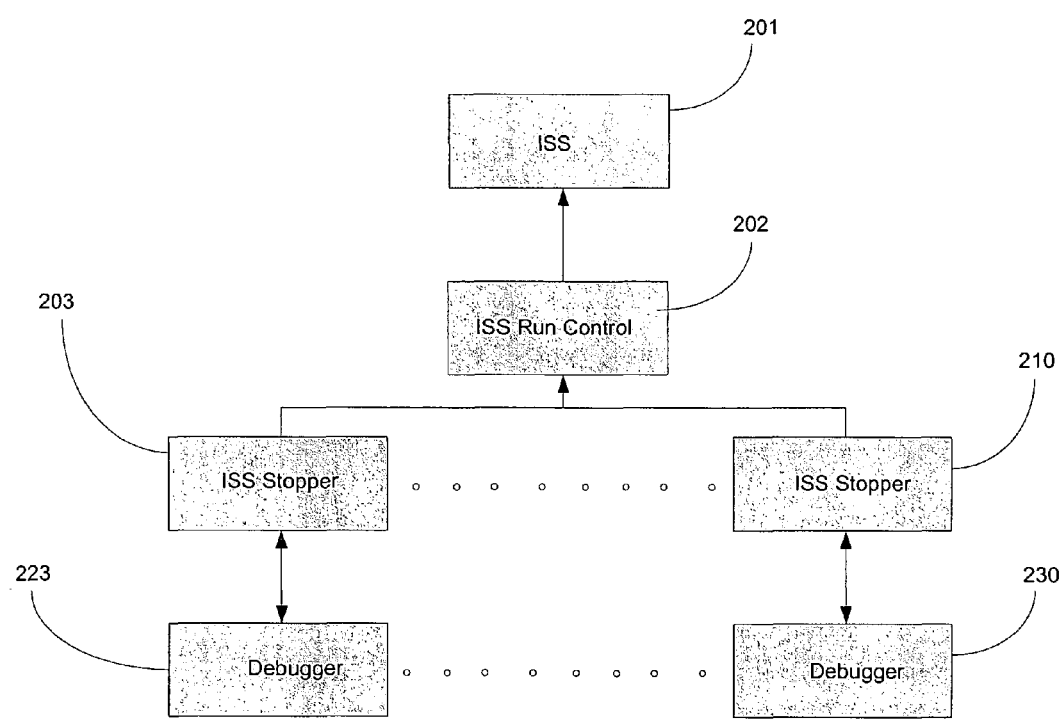
FIG. 2 shows a diagram of a computer implemented ISS (instruction set simulator) debugging process in accordance with one embodiment of the present invention.

Program instructions executed by the computer system can be stored in RAM 102, ROM 103, or the storage device 104 and, when executed in a group, can be referred to as logic blocks or procedures. It is appreciated that data produced at the various software debugging and/or logic synthesis stages of the present invention, including representations of the different levels of abstraction of an instruction set simulation (ISS), can also be stored in RAM 102, ROM 103, or the storage device 104 as shown in FIG. 1.
Embodiments of the Present Invention FIG. 2 shows a diagram 200 illustrating a computer implemented ISS debugging process in accordance with one embodiment of the present invention. As depicted in FIG. 2, diagram 200 shows an ISS 201 and a plurality of debug components 223-230.

Figure 3:
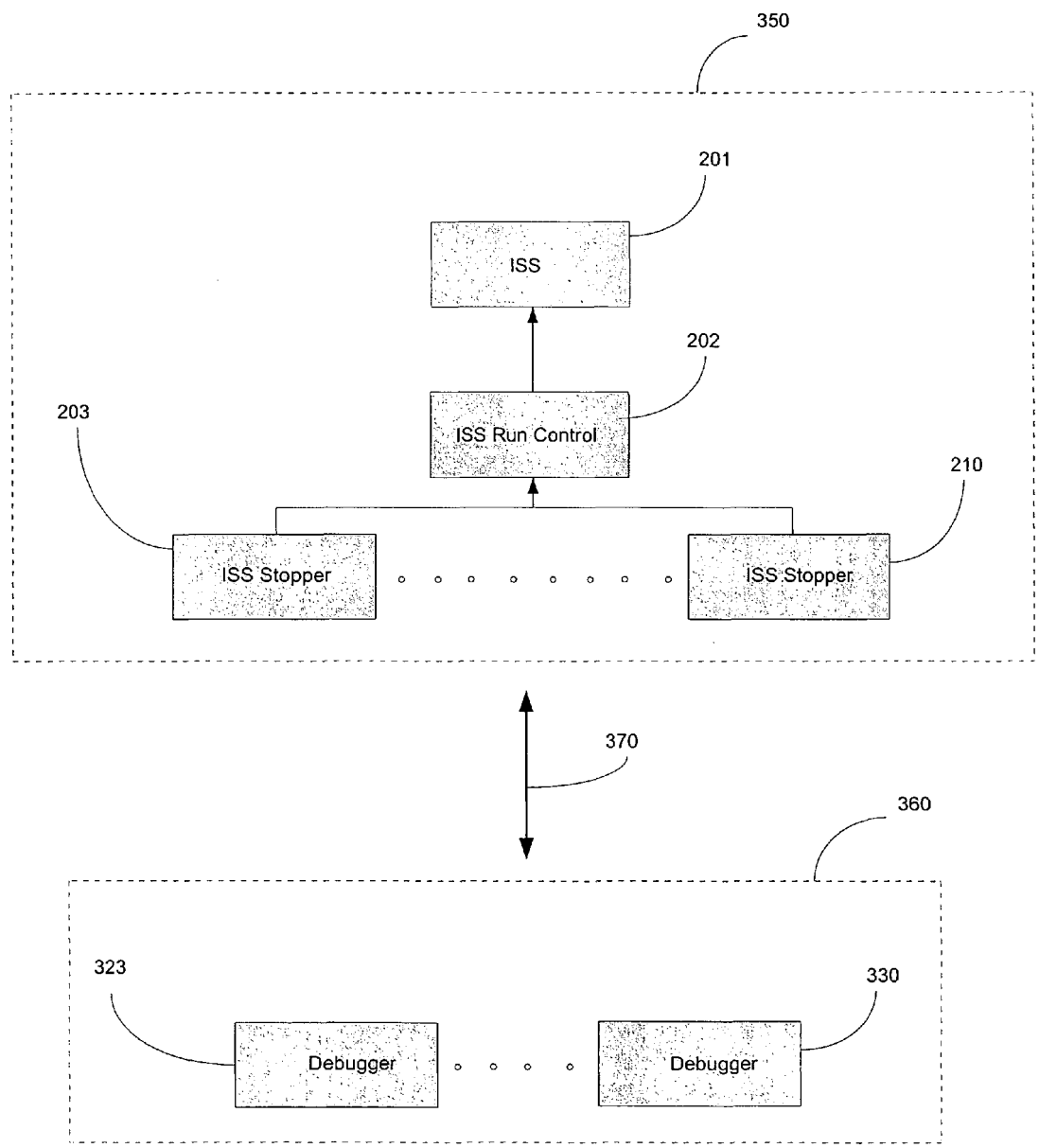
FIG. 3 shows a distributed computer system simulation based software development tool/environment in accordance with one embodiment of the present invention.

FIG. 3 shows a distributed computer system simulation based software development tool/environment 300 in accordance with one embodiment of the present invention. In the FIG. 2 embodiment, the software of the simulation-based software development tool/environment is executed on the computer system resources of, for example, the computer system 112 shown in FIG. 1. Alternatively, as shown in FIG. 3, the simulation based software development tool/environment can be implemented on a distributed computer system, whereby, for example, the debug components 223-230 are executed in a computer system environment 360, while the ISS 201, ISS run control 202, and ISS stoppers 203-210 are executed in a computer system environment 350 on a different machine. The computer systems 350 and 360 are remotely connected via a communications network 370 (e.g., ethernet, IEEE 1394, etc.).

Referring again to FIG. 2, the computer implemented ISS debugging method involves the execution of multiple instructions of the ISS 201. The ISS 201 comprises a simulation model, usually coded in a high-level language, which mimics the behavior of a target device. The actual instructions comprising the simulation execute on the host computer system, in this case, the computer system 112. The simulation, in turn, mimics the operation of a target device. The target device is typically a processor, and the simulation mimics the processor by reading instructions and maintaining internal variables which represents the processor's registers, caches, and/or other internal sequential storage units.

As the instructions comprising the ISS 201 execute on the host computer system 112, the ISS 201 itself executes instructions of a target device. It is the software which is written to execute on this target device which is object of the debugging process, thus leading to the term "simulation-based software development", whereby software being developed to run on a given hardware device is run instead on a simulated model of the hardware (e.g., the ISS 201).

In the FIG. 2 embodiment, the debugging method executes the ISS instructions (e.g., the target instructions) as described above. For each ISS instruction, an ISS simulation state (e.g., of an embedded computer system device) is synchronized to a simulation time when the execution of the instruction is finished. In other words, multiple host instructions of the host computer system 112 need to be executed in order to implement each one of the ISS instructions. The multiple host instructions are executed to update the multiple internal variables which represents the target processor's registers, caches, and/or other internal sequential storage units. An ISS instruction is not considered finished until each of the affected internal variables, registers, caches, etc. are updated to reflect the execution of the ISS instruction. This updating process is referred to as synchronizing to a simulation time.

In this manner, the ISS 201 simulates the operation of the target processor as it updates the target processor's registers, caches, and/or other internal sequential storage units to reflect the execution of the ISS instructions of the program being debugged and/or developed. The ISS 201 is configured to support breakpoints, watchpoints, step modes, and the like in order to allow a software developer to progress forward and/or backwards through the execution of the program to catch bugs, optimize performance, or otherwise analyze program execution.

FIG. 2 shows two debugger components 223 and 230 which are executed in conjunction with the execution of the ISS 201, and are each coupled to control the ISS 201. The debug components 223-230 are generally applications that drive the execution of instructions on the ISS 201 in steps, forwards or backwards, or continuously, with the help of breakpoints and/or watch points. In one embodiment, one or more of the debug components 223-230 can be implemented as source level debug components, meaning the debug component is written using a high-level language. Although FIG. 2 shows only two debugger components 223-230, it should be noted that a larger number of debugger components (e.g., 10 or more) can be similarly coupled.

In one embodiment, the debugger components 223-230 are configured to independently control the operation of the ISS 201. For example, either of the debugger components 223-230 can control the ISS by setting breakpoints within the ISS 201. These breakpoints can be set independent of the other debugger component. Similarly, any one of the debugger components 223-230 can control the ISS 201 by setting watchpoints within the ISS 201, independent of other debugger component.

The debugger components 223-230 are connected to the ISS 201 via an ISS run control component 202 and a respective ISS stoppers 203-210. The ISS run control component 202 can be configured to attach an arbitrary number of debug components to the ISS 201, and prevent run-time interference between the debug components.

The ISS run control component 202 is configured to enable the attached debug components to implement independent and non-interfering operating modes for the ISS 201. The ISS run control component 202 bus functions as an arbiter, by arbitrating access to and control of the ISS 201 among the coupled debugger components 223-230. For example, the debugger 223 can be in a first run mode (e.g., stop, step, stall, etc.), while the debugger 230 is in a second run mode (e.g., run, etc.). The ISS run control component 202 interfaces the debuggers 223-230 to the ISS 201 in such a manner as to prevent run-time interference between any different modes which may be active within the ISS 201 from the debuggers 223-230.

The debugger components 223-230 are respectively coupled to the ISS run control component 202 via ISS stoppers 203-210. The ISS stoppers 203-210 function by ensuring that all entities that are used to stop the ISS 201 under certain conditions are owned by exactly one ISS stopper, and correspondingly, the debugger component that is associated with the ISS stopper. Breakpoints and watchpoints are examples of entities that stop the ISS 201. In one embodiment, on a hit of a stopping condition (e.g. a breakpoint hit or a watchpoint hit), the owning ISS stopper of the entity is consulted. It is the responsibility of the debugger component associated with the owning ISS stopper to respond to the condition hit. This attribute ensures noninterference and proper coordination between any arbitrary number of debug components that may be coupled to the ISS 201 via the ISS run control component 202.

In one embodiment, an ISS stopper can be coupled to, owned and shared between multiple debuggers. The ISS stopper always has one mode at a time. for example, if multiple debuggers are setting the ISS stopper mode, the last mode setting is kept. In such a scenario, the breakpoints and watchpoints would also be shared by the debuggers that share the ISS stopper. For example, one debugger could set a breakpoint. After a breakpoint hit, the ISS and the simulation stops. Another debugger could then remove the breakpoint or continue the simulation.

In this manner, embodiments of the present invention greatly increase the efficiency in debug multi-tasking applications, which require, for example, the following of communication between two tasks on the same host via a channel that is implemented by the kernel. Multiple debug components can be used to follow multiple tasks executing on the operating system. Additionally, multiple debugger components having independent ISS control can more readily handle situations with multicore systems whereby, for example, when one processor core hits a breakpoint while the other processor core continues.

Additional aspects of the computer implemented ISS debugging method embodiments are now described. In one embodiment, during the execution of ISS instructions, the ISS 201 traverses the run states "executing" "synchronizing" and "between instructions", in a cyclic order.

In the executing state, the ISS 201 is in the process of executing an instruction. During the execution of an instruction, the ISS 201 is usually in a transient state. An access to the internal data structures of the ISS 201 from outside the ISS 201 (e.g. from another thread of the operating system of computer system 112, or the simulation task) is usually not performed.

In the synchronizing state, the ISS 201 has finished the execution of an instruction (e.g., it is between two instructions) and is synchronizing to the simulation time, as described above. It should be noted that in an SystemC simulation, the ISS 201 may execute a wait(Clk.posedge_event( )). In a multi-ISS simulation, an ISS in this state may wait for other ISSs to execute their instruction of the current clock cycle.

In the between instructions state, the ISS 201 is between two instructions and synchronized to the simulation time. This time is usually corresponding to the rising edge of the clock that is driving the ISS 201.

As described above, the run mode of the ISS 201 is controlled by the ISS run control component 202. There is one instance of the ISS run control component 202 per ISS. The ISS run control component 202 controls the ISS 201 through a "run" mode, a "step" mode, a "stop" mode, and a "stall" mode. As its name implies, the run mode involves the ISS 201 continuously executing instructions. In the step mode, the ISS 201 executes a single instruction. After execution of the instruction, the ISS run control component 201 automatically switches to stop mode. In the stop mode, the ISS 201 is stopped, meaning that the execution of instructions is suspended. This also means the whole simulation is suspended. In the stall mode, the ISS 201 is running but executing no instruction. This is comparable to the execution of a "no-operation" instruction. This mode allows stopping the execution of the program on one ISS of a multi-ISS simulation while the other ISSs continue with the execution of their programs.

It should be noted that the stopping of the ISS 201 includes the stopping of the whole simulation. Embodiments of the present invention assume the availability of a mechanism that allows stopping the simulation at a moment when the whole simulation model is synchronized. For example, in case of a SystemC simulation, this is the moment when the SystemC time is advanced or between two delta cycles.

A debugger that wants to control the run mode of the ISS 201 has to use an instance in ISS stopper (e.g., ISS stopper 203) that must be associated with the ISS run control component (e.g., ISS run control component 202) of the ISS 201. Each ISS stopper can be set to a "continue" mode, a "step" mode, or a "stop" mode. In the continue mode, the debugger requests the continuous run of the ISS. In the step mode, the debugger requests the ISS run control component 202 to let the ISS 201 run to execute a single instruction and then switch to the stop mode immediately thereafter. In the stop mode, the debugger requests the ISS run control component 202 to stop the ISS 201 after the execution of the current instruction. When the simulation stops, the ISS 201 is expected to be in the "between instructions" state described above, and the ISS run control component 202 is expected to be in the stop mode.

The actual run mode of the ISS 201 is given by the composition of its ISS run control component 202 and the coupled ISS stoppers 203-210. For example, if at least one ISS stopper is in mode stop, the ISS run control component has the run mode stop. Else (i.e. no ISS Stopper is in mode stop) if at least one ISS stopper is in mode step, the ISS run control component has the run mode step. Else (i.e. all ISS stopper are in mode continue), the ISS run control component has the run mode running.

A boolean configuration flag controls whether the ISS run control component enters run state stalled instead of stop when at least one ISS stopper is in mode stop (true: enter stalled, false: enter stop).

The transition from run mode running to run mode stop involves the following. When all ISS stoppers attached to an ISS run control component are in mode continue, the ISS run control component is in run mode running and the ISS is executing instructions. When one ISS stopper changes to mode stop, the ISS run control component immediately changes to run mode stop. It waits until the ISS enters the run state between instructions and stops the whole simulation by the algorithm described above.

The transition from run mode stop to run mode step and back to run mode stop involves the following. When all ISS stoppers attached to an ISS run control component have left mode stop and at least one ISS stopper is in mode step, the ISS run control component is in run mode step. The ISS executes one instruction. The ISS run control component waits until the ISS enters the run state between instructions. When the state is entered, the ISS run control component switches to run mode stop and stops the whole simulation by the algorithm described above.

Transition from run mode running to run mode step and to run mode stop involves the following. When all ISS stoppers attached to an ISS run control component are in mode continue, the ISS run control component is in run mode running and the ISS is executing instructions. When one ISS stopper changes to mode step, the ISS run control component waits until the ISS enters the run state between instructions. When the state is entered, the ISS run control component switches to run mode step. The ISS executes one further instruction. The ISS run control component waits until the ISS again enters the run state between instructions. When the state is entered, the ISS run control component switches to run mode stop and stops the whole simulation by the algorithm described above.

Figure 4:
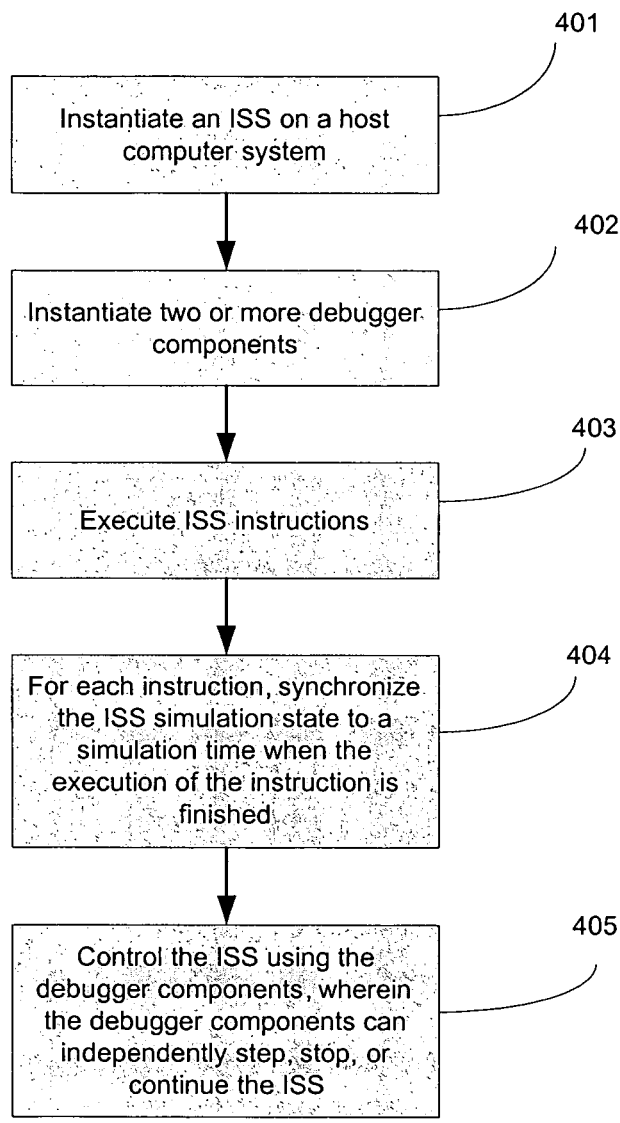
FIG. 4 shows a flowchart of a simulation based debugging process in accordance with one embodiment of the present invention.

Referring now to FIG. 4, a flowchart of a debugging process 400 in accordance with one embodiment of the present invention is shown. As depicted in FIG. 4, process 400 shows the operating steps of a simulation based debugging method, as two or more debugger components are coupled to control an ISS executing on a host computer system.

Process 400 begins in step 401, where an ISS (e.g., ISS 201) is instantiated on the host computer system (e.g., computer system 112). In step 402, two or more debugger components (e.g., debugger components 223-230) are instantiated to control the ISS 201. In step 403, ISS instructions are executed to simulate the target processor. In step 404, for each ISS instruction, the ISS simulation state is synchronized to a simulation time when the execution of the current instruction is finished. Subsequently as the simulation progresses, in step 405, the ISS 201 is controlled using the debugger 10 components 223-230 to debug one or more software programs running on the target processor. As described above, the debugger components 223-230 can independently step, stop, continue, or the like (e.g., using breakpoints, watch points, etc.), the ISS 201 to debug aspects of one or more software programs running on the target processor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A computer implemented method for ISS (instruction set simulator) debugging, the method comprising:
    executing an ISS (instruction set simulator) that runs a simulation of a multicore target device;
    executing a plurality of debugger components in conjunction with the execution of the ISS, each of the plurality of debugger components coupled to independently control the ISS via the ISS run control component;
    executing the plurality of debugger components in a run mode; and
    responsive to a debugger component from the plurality of debugger components transitioning from the run mode to a stop mode:
    setting a Boolean configuration flag based on the debugger component transitioning to stop mode, and
    completely stopping, by the ISS run control component, the ISS and the simulation of the multicore device based on the Boolean configuration flag, while the ISS and the simulation of the multicore device are completely stopped, at least a different debugger component from the plurality of debugger components continuing to execute in the run mode.

2. The method of claim 1, wherein each debugger component independently sets breakpoints within the ISS.

3. The method of claim 1, wherein each debugger component independently sets watchpoints within the ISS.

4. The method of claim 1, wherein the plurality of debugger components communicate with the ISS via the ISS run control component, and the ISS run control component preventing run-time interference between the plurality of debugger components.

5. The method of claim 1, wherein each debugger component communicates with the ISS run control component via an ISS stopper.

6. A non-transitory computer readable storage medium, the computer readable storage medium having computer readable instructions therein, which when executed by a processor of a computer system causes the performance of steps comprising:
    executing an ISS (instruction set simulator) that runs a simulation of a multicore target device;
    executing a plurality of debugger components in conjunction with the execution of the ISS, each of the plurality of debugger components coupled to independently control the ISS via the ISS run control component;
    executing the plurality of debugger components in a run mode; and
    responsive to a debugger component from the plurality of debugger components transitioning from the run mode to a stop mode:
    setting a Boolean configuration flag based on the debugger component transitioning to stop mode, and
    completely stopping, by the ISS run control component, the ISS and the simulation of the multicore device based on the Boolean configuration flag, while the ISS and the simulation of the multicore device are completely stopped, at least a different debugger component from the plurality of debugger components continuing to execute in the run mode.

7. The computer readable storage medium of claim 6, wherein each debugger component independently sets breakpoints within the ISS.

8. The computer readable storage medium of claim 6, wherein each debugger component independently sets watchpoints within the ISS.

9. The computer readable storage medium of claim 6, wherein the plurality of debugger components communicate with the ISS via the ISS run control component, and the ISS run control component preventing run-time interference between the plurality of debugger components.

10. The computer readable storage medium of claim 6, wherein each debugger component communicates with the ISS run control component via an ISS stopper.

11. A system for ISS (instruction set simulator) debugging, the system comprising:
    a computer processor; and
    a non-transitory computer-readable storage medium having computer program instructions that when executed by a computer processor cause the performance of steps comprising:
    executing an ISS (instruction set simulator) that runs a simulation of a multicore target device;
    executing a plurality of debugger components in conjunction with the execution of the ISS, each of the plurality of debugger components coupled to independently control the ISS via the ISS run control component;
    executing the plurality of debugger components in a run mode; and
    responsive to a debugger component from the plurality of debugger components transitioning from the run mode to a stop mode:
    setting a Boolean configuration flag based on the debugger component transitioning to stop mode, and
    completely stopping, by the ISS run control component, the ISS and the simulation of the multicore device based on the Boolean configuration flag, while the ISS and the simulation of the multicore device are completely stopped, at least a different debugger component from the plurality of debugger components continuing to execute in the run mode.

12. The system of claim 11, wherein each debugger component independently sets breakpoints within the ISS.

13. The system of claim 11, wherein each debugger component independently sets watchpoints within the ISS.

14. The system of claim 11, wherein each debugger component communicates with the ISS run control component via an ISS stopper.

* * * * *